United States Patent
Shinagawa (12) 
(10) Patent No.: US 10,795,304 B2
(45) Date of Patent: Oct. 6, 2020

(54) IMAGE FORMING APPARATUS IN WHICH PRINTING OPERATION AT END OF LIFE OF ATTACHED CONSUMABLE PRODUCT IS SETTABLE

(71) Applicant: CANON KABUSHIKI KAISHA, Tokyo (JP)

(72) Inventor: Kazutaka Shinagawa, Tsukuba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/051,873

(22) Filed: Aug. 1, 2018

(65) Prior Publication Data
US 2019/0041786 A1 Feb. 7, 2019

(30) Foreign Application Priority Data
Aug. 7, 2017 (JP) ................... 2017-152634

(51) Int. Cl.
G03G 15/00 (2006.01)
H04N 1/00 (2006.01)
G03G 21/18 (2006.01)

(52) U.S. Cl.
CPC ......... *G03G 15/556* (2013.01); *G03G 15/553* (2013.01); *G03G 21/1889* (2013.01); *H04N 1/00824* (2013.01); *H04N 1/00962* (2013.01); *G03G 2221/1663* (2013.01)

(58) Field of Classification Search
CPC ............. G03G 15/556; G03G 15/553; G03G 21/1875; G03G 21/1889; G03G 2221/1663; G03G 2221/1666; G03G 15/75; H04N 1/00824; H04N 1/00962
See application file for complete search history.

(56) References Cited

U.S. PATENT DOCUMENTS

| 3,893,414 A * | 7/1975 | Hudson | G03G 15/0921 399/267 |
| 3,898,170 A * | 8/1975 | Kasper | G03G 9/1133 430/111.34 |
| 5,084,733 A * | 1/1992 | Katoh | G03G 15/0812 399/104 |
| 2007/0146398 A1* | 6/2007 | Igarashi | B41J 2/17566 347/7 |
| 2008/0292357 A1* | 11/2008 | Taguchi | G03G 15/0121 399/119 |

(Continued)

FOREIGN PATENT DOCUMENTS

| JP | 2003-195699 A | 7/2003 |
| JP | 2010-054998 A | 3/2010 |

OTHER PUBLICATIONS

Mizes, Howard, et al. "Electrophotography Overview." Society for Imaging Science and Technology, 2015, www.imaging.org/site/IST/Resources/Imaging_Tutorials/Electrophotography_Overview/IST/Resources/Tutorials/Xerography.aspx?hkey=fcba9c09-db7e-45f1-b80e-fa3bc182cb49. (Year: 2015).*

*Primary Examiner* — Walter L Lindsay, Jr.
*Assistant Examiner* — Laura Roth
(74) *Attorney, Agent, or Firm* — Canon U.S.A., Inc., IP Division (57) ABSTRACT

An image forming apparatus, detachably connected to a consumable product including a plurality of function units integrated with each other, includes an acquisition unit that acquires a life of each of the plurality of function units and a setting unit that sets an operation in a case where each acquired life reaches a preset value.

19 Claims, 6 Drawing Sheets

(56) References Cited

U.S. PATENT DOCUMENTS

| | | | |
|---|---|---|---|
| 2009/0180802 A1* | 7/2009 | Sato | G03G 21/1821 399/119 |
| 2012/0230709 A1* | 9/2012 | Sakaguchi | G03G 15/5079 399/27 |
| 2018/0150264 A1* | 5/2018 | Oguma | G03G 15/5075 |

* cited by examiner

IMAGE FORMING APPARATUS IN WHICH PRINTING OPERATION AT END OF LIFE OF ATTACHED CONSUMABLE PRODUCT IS SETTABLE

BACKGROUND

Field

The present disclosure relates to an image forming apparatus and an information processing method.

Description of the Related Art

As one type of consumable product for an image forming apparatus, a process cartridge that is an all-in-one cartridge is widely known. Toner, a photosensitive drum, and a developer are integrated into the process cartridge. A user is typically not notified regarding the life of respective elements, such as toner, a drum and a developer, of an image forming apparatus, but is notified about a life of an entire process cartridge in an integrated manner in consideration of the lives of the individual elements. This enables the user to know replacement times of consumable products without recognizing consumable lives of the individual elements (Japanese Patent Application Laid-Open No. 2003-195699). An overriding function for performing a continuous operation at an end of life of the entire process cartridge is also known (Japanese Patent Application Laid-Open No. 2010-054998). As for the life of the entire process cartridge, a user is notified directly via a user interface (UI) display. The user can understand a life status by obtaining information from an external system. Obtaining the life from the external system is effective for reducing a call for a service engineer in a service engineer operation for receiving a call for replacement of a process cartridge from a user.

Consumable parts that are detachable by a user or a service engineer, such as a fixing unit, an intermediate transfer belt (ITB: secondary transfer belt), a sheet feed roller, and the like, are known.

A user can make setting for overriding at an end of life by selectively performing a continuous operation, completely performing the continuous operation after a pause, or completely stopping an operation. However, the setting can be made only for the entire process cartridge. This setting cannot respond to a definite request, such that toner is desired to be continuously used regardless of unclear print if the end of life of the toner is detected, but the operation completely stops in order to securely avoid toner scattering if the end of life of a developer is detected. Suitable notification control cannot be made based on the setting for overriding.

SUMMARY

The present disclosure is directed to a mechanism that appropriately controls a consumable product based on a consumed level of the consumable product and settings for elements of the consumable product. The consumable product is appropriately controlled based on user requests.

According to an aspect of the present disclosure, an image forming apparatus, detachably connected to a consumable product including a plurality of function units integrated with each other, includes an acquisition unit configured to acquire a life of each of the plurality of function units and a setting unit configured to set an operation in a case where each acquired life reaches a preset value.

Further features will become apparent from the following description of exemplary embodiments with reference to the attached drawings.

DESCRIPTION OF THE EMBODIMENTS

Exemplary embodiments will be described below with reference to the drawings.

Figure 1:
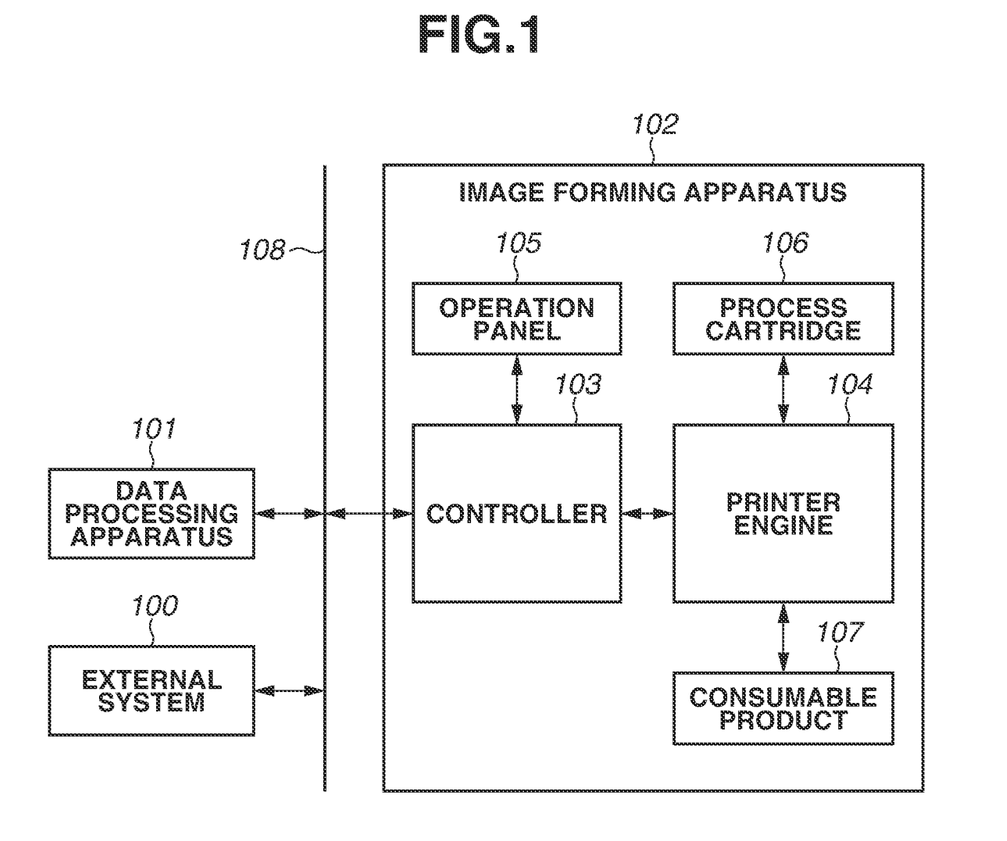
FIG. 1 is a diagram illustrating one example of a hardware configuration of an image forming apparatus.

FIG. 1 is a diagram illustrating one example of a hardware configuration of an image forming apparatus.

An external system 100 acquires information about statuses of a process cartridge 106 and a consumable product 107, both of which are detachable from an image forming apparatus 102. The process cartridge 106, which is detachable, is one example of detachable consumable product.

A data processing apparatus 101 (for example, personal computer (PC)) generates image data and transmits the generated image data to the image forming apparatus 102.

The image forming apparatus 102 (for example, laser printer) receives the image data from the data processing apparatus 101 and forms an image on a sheet based on the received image data. The image forming apparatus 102 can be a multi-function peripheral including a scanner function and a facsimile function.

A controller 103 generates bitmap data based on page description language (PDL) data and transmits the generated bitmap data to a printer engine 104. Details of the controller 103 will be described below with reference to FIG. 2.

The printer engine 104 forms, based on the bitmap data received from the controller 103, an image on a sheet using toner in an electro-photographic method. An image forming method can be an ink-jet method or the like other than the electro-photographic method. A recording material in the electro-photographic method is toner, while a recording material in the ink-jet method is ink.

In the present exemplary embodiment, the controller 103 and the printer engine 104 are separate from each other, but can be integrated together.

An operation panel 105 is a user interface including a display unit that provides various information to a user and an operation unit that receives various operations from a user.

The process cartridge 106 is a consumable product in which toner, a photosensitive drum, and a developing unit are integrated. The process cartridge 106 is detachable from the image forming apparatus 102. The process cartridge 106 can be configured by a toner cartridge and a drum cartridge, which are separated from each other.

The consumable product 107 is a consumable product other than the process cartridge 106. Examples of the consumable product 107 are a fixing unit, a transfer unit, and a sheet feed roller, that are detachable from the image forming apparatus 102.

A local area network (LAN) 108 is connected to the external system 100 and the data processing apparatus 101. The external system 100 acquires information about the image forming apparatus 102. The data processing apparatus 101 transmits image data.

Figure 2:
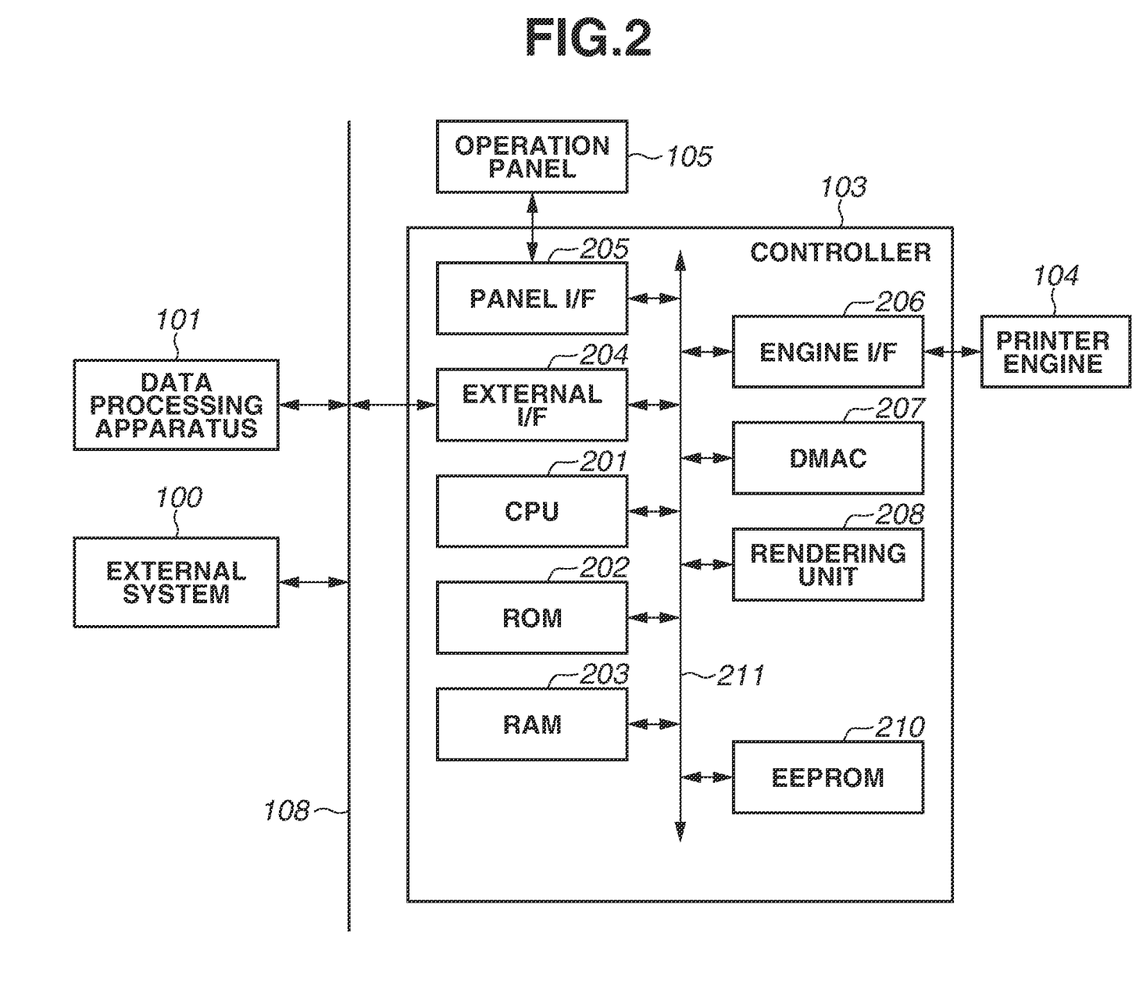
FIG. 2 is a diagram illustrating one example of a hardware configuration of a controller.

FIG. 2 is a diagram illustrating one example of a hardware configuration of a controller 103 and the like.

The controller 103, including a central processing unit (CPU) 201, controls an entire operation of the image forming apparatus 102. The CPU 201 loads a program stored in a read only memory (ROM) 202 into a random access memory (RAM) 203, and executes processing based on the loaded program. In such a manner, the CPU 201 controls the image forming apparatus 102.

The ROM 202 stores a program to be executed by the CPU 201.

The RAM 203 stores a program loaded from the ROM 202. The RAM 203 also stores PDL data, intermediate data generated by interpreting the PDL data, bitmap data generated by rendering the intermediate data, temporary various processing statuses, and log information necessary for other processing.

An external interface (I/F) 204 is an interface that connects the external system 100 and the data processing apparatus 101 to the controller 103 via the LAN 108. As a result, the external I/F 204 relays data communication, namely, data transmission and reception. The present exemplary embodiment describes, as an example, a case where the external I/F 204 communicates with the external system 100 and the data processing apparatus 101 via the LAN 108. This case is, however, not seen to be limiting. For example, the external I/F 204 can communicate with the external system 100 and the data processing apparatus 101 via a wireless network. The external I/F 204 can establish connection via another protocol (for example, universal serial bus (USB)).

A panel I/F 205 is an interface that connects the operation panel 105 with the controller 103. The CPU 201 controls, via the panel I/F 205, a screen to be displayed on the operation panel 105. The CPU 201 detects, via the panel I/F 205, an operation performed by a user via the operation panel 105.

An engine I/F 206 connects the printer engine 104 with the controller 103. The CPU 201 transmits or receives data or a control command to or from the printer engine 104 via the engine I/F 206.

A direct memory access controller (DMAC) 207 receives a command from the CPU 201 and performs data access to the RAM 203, i.e., writes or reads data.

A rendering unit 208 rasterizes intermediate data into bitmap data.

An electrically erasable programmable (EEP) ROM 210 stores setting information about the image forming apparatus 102.

A bus 211 connects respective configurations in the controller 103 to each other.

Figure 3:
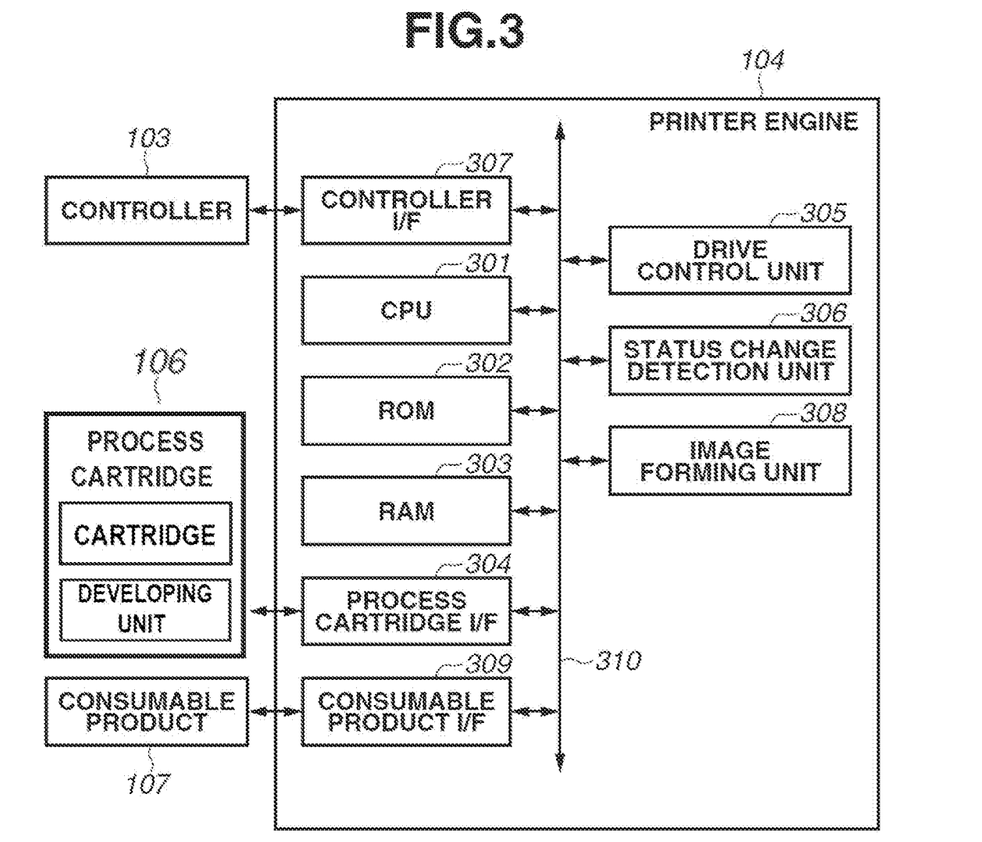
FIG. 3 is a diagram illustrating one example of a hardware configuration of a printer engine.

FIG. 3 is a diagram illustrating one example of a hardware configuration of the printer engine 104.

A CPU 301 loads a program stored in a ROM 302 into a RAM 303, and executes the program. In such a manner, the CPU 301 controls the printer engine 104.

The ROM 302 stores a program to be executed by the CPU 301.

The RAM 303 stores a program loaded from the ROM 302.

A process cartridge I/F 304 connects the process cartridge 106 and the printer engine 104 to transmit or receive information about respective sections of the process cartridge 106.

A drive control unit 305 drives various motors necessary for an image forming unit 308 to form an image.

A status change detection unit 306 detects a status change, such as jam or cover open, in the image forming apparatus 102. A status change can be detected by the CPU 301.

A controller I/F 307 connects the controller 103 and the printer engine 104 to each other to relay data communication therebetween, i.e., transmission or reception of data.

The image forming unit 308 forms an image on a sheet using toner in the electro-photographic method, based on the bitmap data received from the controller 103.

A consumable product I/F 309 connects a consumable product, e.g., consumable product 107, other than the process cartridge 106 to the printer engine 104. The consumable product 107 includes the fixing unit, the transfer unit, and the sheet feed roller that are detachable from the image forming apparatus 102. The consumable product I/F 309 transmits or receives information about the respective sections of the consumable product 107.

A bus 310 connects the respective configurations in the printer engine 104 to each other.

<Operation of Controller>

Information processing in the controller 103 during a time between an end of life and stopping of an operation according to the first exemplary embodiment will be described as one example with reference to a flowchart in FIG. 4.

The present exemplary embodiment will describe the process cartridge 106 in which a developing unit and a toner cartridge are integrated with each other. The developing unit contains a developing roller for developing an image to a photosensitive member. The toner cartridge adds toner to the developing unit.

An end of life will be defined herein.

The end of life means a state that a consumable product is used until printing performance in the image forming apparatus 102 cannot be ensured. One example of the end of life with respect to toner is a state where a toner remaining amount is determined as zero.

Figure 4:
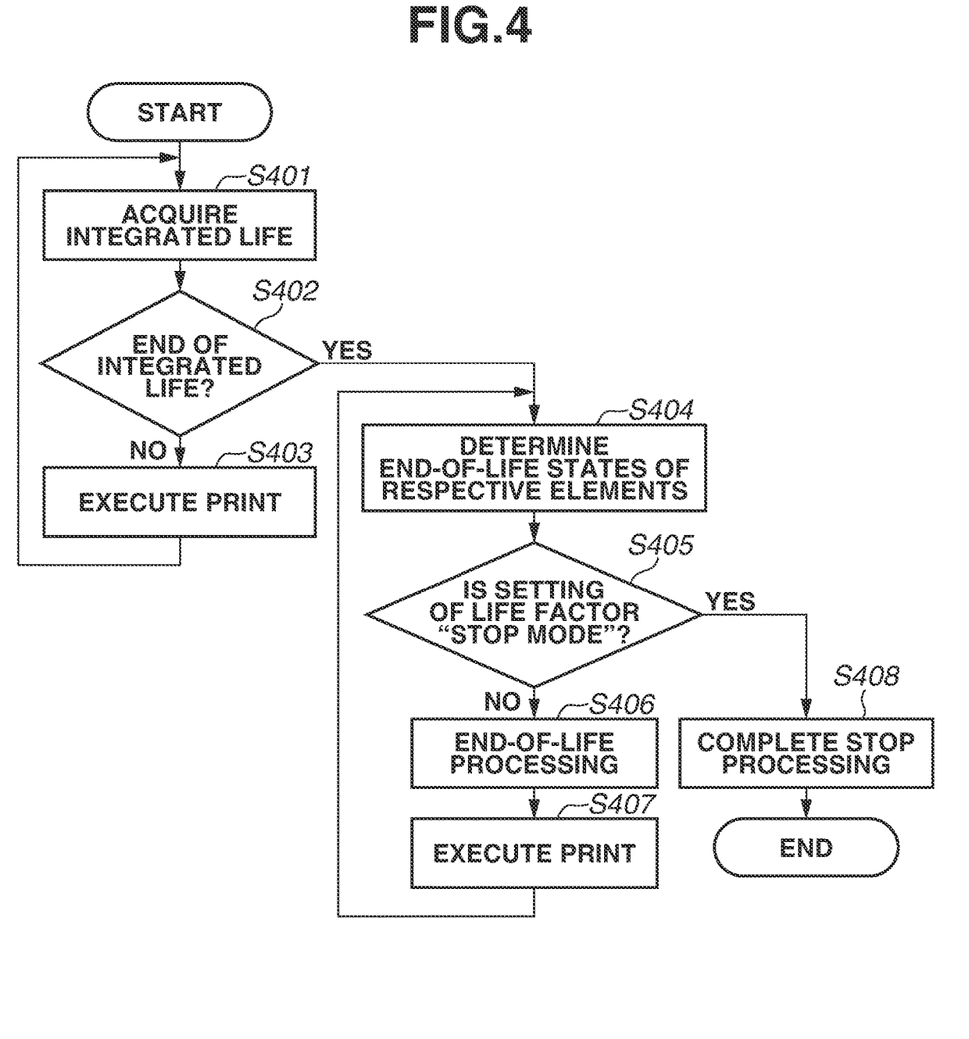
FIG. 4 is a flowchart illustrating one example of information processing according to a first exemplary embodiment.

The control illustrated in the flowchart of FIG. 4 is implemented such that, in the controller 103, the CPU 201 loads a control program stored in the ROM 202 into the RAM 203 and executes the program.

In step S401, the CPU 201 acquires an integrated life of the entire process cartridge from the process cartridge 106 via the printer engine 104 at a time of activation or restoration from a sleep condition. The integrated life is calculated based on a toner remaining amount and a life of the developing unit. It is assumed that the integrated end of life is calculated by the CPU 301, but it can be calculated by the CPU 201. The following is one example of a method for calculating the integrated life, and this example is not seen to be limiting. The CPU 301 acquires a toner remaining amount of the process cartridge 106 and a life of the developing unit via the process cartridge I/F 304. The toner remaining amount or the life of the developing unit whose value is smaller is determined as the integrated life. For example, if the toner remaining amount of the process cartridge 106 is 10% and the life of the developing unit of the process cartridge 106 is 5%, the CPU 301 acquires 5% as the integrated life. One example of a method for calculating the toner remaining amount acquired by the CPU 301 is a calculating method for correcting a remaining amount detection value acquired from a toner remaining amount detection sensor of a toner cartridge using a used amount calculated by summing up pixel counts during printing. In one example of a method for calculating the life of a developing unit acquired by the CPU 301, the life of the developing unit can be calculated based on a travel distance and an accumulated rotation number of a developing roller of a developing unit. In the calculation of the life of the developing unit, correction processing for calculating an abrasion degree of the photosensitive member and appropriately correcting a life based on the abrasion degree can be executed.

In step S402, the CPU 201 determines whether the acquired integrated life reaches the integrated life. In a case where the CPU 201 determines that the acquired integrated life does not reach the integrated life (NO in step S402), the processing proceeds to step S403. In a case where the CPU 201 determines that the acquired integrated life reaches the integrated life (YES in step S402), the processing proceeds to step S404. The end of the integrated life is stored in the EEPROM 210 in advance, and is, for example, 0%.

In step S403, the CPU 201 controls print execution. The CPU 201 then returns to step S401. In a case where the print processing is executed in step S403, calculation processing is executed for the toner remaining amount and the life of the developing unit. As a result, the toner remaining amount and the life of the developing unit are updated. The updating processing can be executed every time one-page print or every time one print job is completed.

In step S404, the CPU 201 acquires the toner remaining amount and the life of the developing unit from the process cartridge 106 via the printer engine 104 and determines whether respective values reach the lives. Since the determination whether to reach the integrated life is made in step S402, one or more of the toner remaining amount and the life of the developing unit is at the end of life.

Figure 5A:
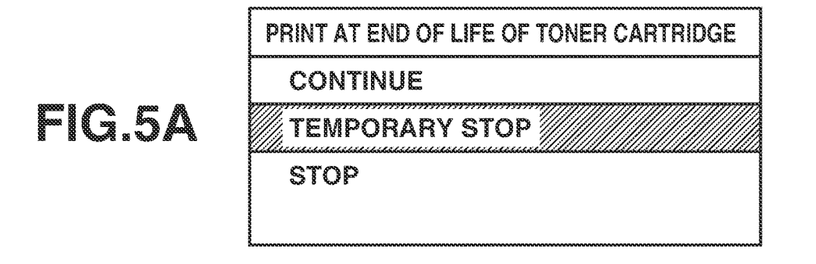
FIGS. 5A, 5B, 5C, 5D, and 5E are diagrams illustrating examples of a screen relating to settings at the ends of lives of respective elements.
Figure 5B:
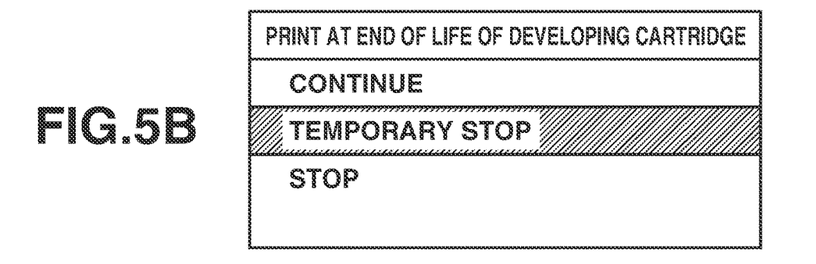

In step S405, the CPU 201 determines whether operation settings at the end of the lives of the respective elements determined as being at the end of the lives are a "stop mode". The image forming apparatus 102 can set how to operate individually as the operation settings at the ends of the lives when the respective elements and consumable products are at the end of lives. FIGS. 5A to 5E illustrate UI examples of the operation settings at the ends of the lives of the respective elements. The UIs (setting screens) illustrated in FIGS. 5A to 5E are displayed on the operation panel 105. FIG. 5A illustrates the UI example in which a "continuous mode", a "temporary stop mode", and a "stop mode" can be selected as setting items of a toner element. In the "continuous mode", the print operation continues. In the "temporary stop mode", the print operation temporarily stops and then continues via a user operation. In the "stop mode", the print operation thereafter is not permitted. FIG. 5A illustrates a state that the "temporary stop mode" is selected. FIG. 5B illustrates a setting screen example similar to the setting screen example of the toner element as a setting item of a developing unit. Contents set on the setting screens in FIGS. 5A to 5E are stored in the EEPROM 210, but can be stored in the RAM 203 or in another storage location (not illustrated).

In step S405, the CPU 201 determines whether the "stop mode" is set as the operation setting at the end of life of the respective elements determined as being at the end of life. In a case where a plurality of elements determined as being at the end of life is present, if the CPU 201 determines that operations for any of the elements at the end of life are set to the "stop mode" (YES in step S405), the processing proceeds to step S408. If not (NO in step S405), the processing proceeds to step S406. In a case where the CPU 201 determines that an operation setting for one element determined as being at the end of life is the "stop mode" (YES in step S405), the processing proceeds to step S408. If not (NO in step S405), the processing proceeds to step S406.

In step S406, the CPU 201 executes end-of-life processing on an element that is determined as being at the end of life and is set to the "continuous mode" or the "temporary stop mode" as the operation setting at the end of life. The CPU 201 displays an end-of-life warning on the operation panel 105 for the element that is set to the "continuous mode" as the operation setting at the end of life in the end-of-life processing. As a content of the end-of-life warning, for example, a message for urging replacement can be employed. If any elements are set to the "temporary stop mode" as the operation setting at the end of life in the end-of-life processing, the CPU 201 displays a temporary stop warning on the operation panel 105. In this case, the CPU 201 makes a transition to a state that a new print request is not accepted. If a user operates the operation panel 105 to cancel the temporary stop mode, the CPU 201 makes a transition to a state that a new print request is accepted, and displays the end-of-life warning on the operation panel 105. Only in a case where the CPU 201 executes the processing in step S406 first for the process cartridge 106, the CPU 201 notifies the external system 100 of the end of life via the external I/F 204. If the plurality of elements determined as being at the end of life is set to the "temporary stop mode", the CPU 201 temporarily stops the print operation only in a case where the element set to the "temporary stop mode" is first determined as being at the end of life. The CPU 201 then does not temporarily stop the print operation and continues the operation during the continuous operation even in a case where the subsequent elements in the "temporary stop mode" are determined as being at the end of life. This enables avoiding temporary stopping of the process cartridge 106 two or more times.

In step S407, the CPU 201 controls the execution of print. The CPU 201 then returns to step S404.

In step S408, the CPU 201 shifts the image forming apparatus 102 into a completely stopping state and inhibits the subsequent print operation.

The processing in the first exemplary embodiment can implement a behavior based on the end of life of respective elements of the consumable product. More specifically, the life of the toner is set in the "continuous mode" or the "temporary stop mode" and the life of developing unit is set in the "stop mode" in advance. This can implement the following behavior. In a case where the life of toner is determined, the print continues regardless of unclear print. However, in a case where the life of the developing unit is determined, the print operation completely stops in order to securely avoid toner scattering.

The first exemplary embodiment describes the example of the process cartridge 106 where the cartridge containing the toner and the developing unit are integrated with each other. However, a process cartridge can be configured so that the cartridge containing the toner, the photosensitive drum, and the developing unit are integrated or some of them are separated as another cartridge.

The present disclosure is not limited to the process cartridge 106, and is applicable to another consumable product 107.

The first exemplary embodiment describes the operation of the controller 103 during the time between the end of life and the stop. A second exemplary embodiment will describe a method for enabling control relating to a consumable product in consideration with a life limit and stopping an operation in addition to the consumable products described in the first exemplary embodiment with reference to a flowchart in FIG. 6.

The present exemplary embodiment will describe the process cartridge 106.

Herein, a life warning and a life limit are defined.

The life warning is a warning providing a notice that the end of life may come at a timing before the end of life. The timing is stored in the EEPROM 210. The CPU 201 can set or change the timing based on a user operation via the operation panel 105. For example, with respect to toner, the timing is for a state that the toner remaining amount is determined as small. In a case where the toner remaining amount is expressed in terms of a percentage, a user specifies a percent of the toner remaining amount to be able to change the setting.

The life limit refers to a state where, when the toner is continuously used at the end of life, additional use of the toner affects a printer operation. A condition under which the life limit is determined is stored in the EEPROM 210, and the CPU 201 can set or change the condition based on an operation by a user via the operation panel 105. For example, the life limit state of the toner alone is a state that print is greatly blurred due to insufficient toner.

Figure 5C:
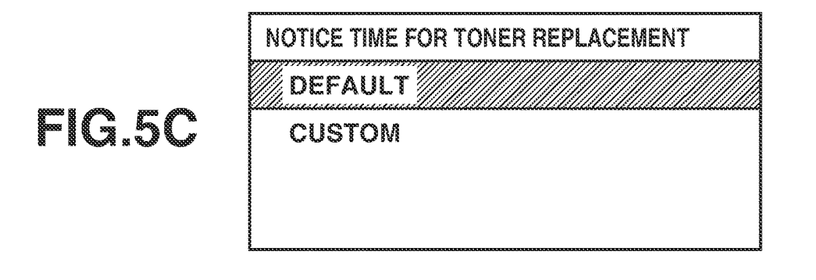
Figure 5D:
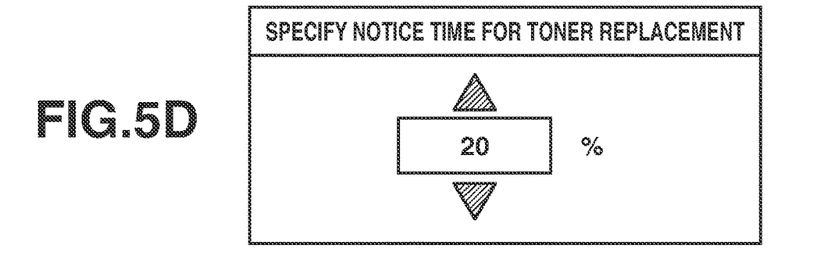
Figure 5E:
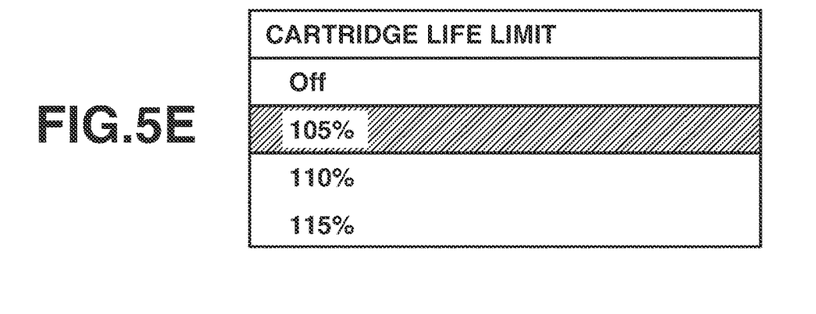

FIGS. 5A to 5E illustrate UI examples of the life warning timing setting and the life limit condition. FIG. 5C illustrates the UI example of the life timing setting. FIG. 5C illustrates an example of "default" setting and an example of "custom" setting. In the "default" setting, a life warning timing notice is received from the printer engine 104 via the engine I/F 206. In the "custom" setting, the controller 103 specifies predetermined amount timing of a cartridge remaining amount of the process cartridge 106. FIG. 5D illustrates an example that the predetermined amount timing is specified in the "custom" setting. In the example of FIG. 5D, the timing can be set for every amount of 1%, but as illustrated in FIG. 5E, UI can be such that a setting value is selected in terms of a several % s. FIG. 5E illustrates an UI example of a cartridge life limit condition. FIG. 5E illustrates an example of options for specifying "Off" or percent of the life limit in a case where 100% is for the end of life. "Off" is for a case where the limit is not set conventionally. This UI can be an UI for setting in terms of 1% as illustrated in FIG. 5D. The processing for storing a condition under which the CPU 201 determines a life limit in the EEPROM 210 based on the UI in FIG. 5E is one example of processing for setting a life limit for every element of the detachable consumable product based on an operation via a setting screen.

Figure 6:
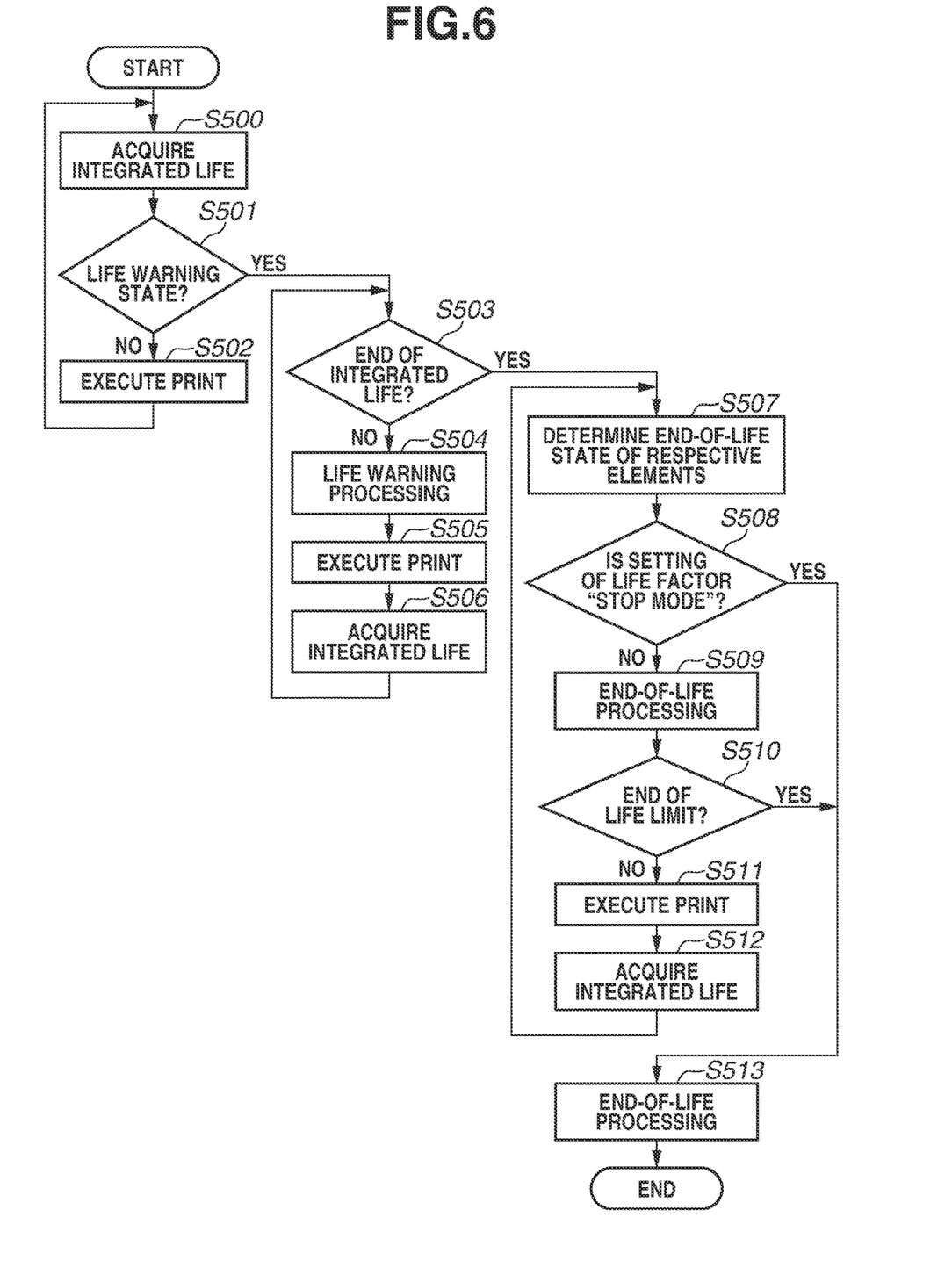
FIG. 6 is a flowchart illustrating one example of information processing according to a second exemplary embodiment.

Control illustrated in the flowchart of FIG. 6 is implemented in the controller 103 such that the CPU 201 loads the control program stored in the ROM 202 into the RAM 203 to execute the control program.

In step S500, the CPU 201 acquires an integrated life of the entire process cartridge from the process cartridge 106 via the printer engine 104 at the time of startup or return from a sleep state. The integrated life is calculated from the toner remaining amount and the life of the developing unit. Processing in step S500 is similar to the processing in step S401.

In step S501, the CPU 201 determines, based on the acquired integrated life, whether the life warning is necessary. In a case where the CPU 201 determines, based on the acquired integrated life and the setting of the life warning timing, that the life warning is necessary (YES in step S501), the processing proceeds to step S503. In a case where the CPU 201 determines that the life waning is not necessary (NO in step S501), the processing proceeds to step S502.

In step S502, the CPU 201 controls execution of print. Then, the processing returns to step S500.

In step S503, the CPU 201 determines whether the acquired integrated life is at the end of life. In a case where the CPU 201 determines that the acquired integrated life is not at the end of life (NO in step S503), the processing proceeds to step S504. In a case where the acquired integrated life is at the end of life (Yes in step S503), the processing proceeds to step S507. The end of life is stored in the EEPROM 210, and for example, 0% can be employed similarly to the first exemplary embodiment.

In step S504, the CPU 201 executes life warning processing. More specifically, in the life warning processing, the CPU 201 displays a life waning on the operation panel 105 via the panel I/F 205. The CPU 201 notifies the external system 100 of a life warning state via the external I/F 204. As a content of the life warning, for example, a message for urging preparation for a new process cartridge can be employed. Upon receipt of the life warning state from the image forming apparatus 102, the external system 100 can deliver a new process cartridge to an installation place of the image forming apparatus 102.

In step S505, the CPU 201 controls execution of print.

When the print in step S505 completes, then in step S506, the CPU 201 acquires an integrated life of the entire process cartridge after completion of the print. The processing then returns to step S503.

Control relating to the end of life and the life limit will be described below. In step S507, the CPU 201 acquires a toner remaining amount and a life of the developing unit from the process cartridge 106 via the printer engine 104, and determines whether these values indicate the ends of lives, respectively.

In step S508, the CPU 201 determines whether the "stop mode" is set as the operation setting at the end of life of the respective elements determined as being at the end of life. In a case where a plurality of elements determined as being at the end of life is present, if the CPU 201 determines that operations for any of the elements at the end of life are set to the "stop mode" (YES in step S508), the processing proceeds to step S513. If not (NO in step S508), the processing proceeds to step S509. In a case where the CPU 201 determines that an operation setting for one element determined as being at the end of life is the "stop mode" (YES in step S508), the processing proceeds to step S513. If not (NO in step S508), the processing proceeds to step S509.

In step S509, the CPU 201 executes the end-of-life processing on an element that is determined as being at the end of life and is set to the "continuous mode" or the "temporary stop mode" as the operation setting at the end of life. The CPU 201 displays an end-of-life warning on the operation panel 105 for the element that is set to the "continuous mode" as the operation setting at the end of life in the end-of-life processing via the panel I/F 205. In the end-of-life processing, the CPU 201 displays an end-of-life warning on the operation panel 105 after a user operates the operation panel 105 for the element that is set to the "temporary stop mode" as the operation setting at the end of life so that the temporary stop mode is canceled. Only in a case where the processing in step S509 is first executed on the process cartridge 106, the CPU 201 notifies the external system 100 of the end of life via the external I/F 204. If the plurality of elements determined as being at the end of life is set to the "temporary stop mode", the CPU 201 temporarily stops the print operation only in a case where the element set to the "temporary stop mode" is first determined as being at the end of life. The CPU 201 then does not temporarily stop the print operation and continues the operation during the continuous operation even in a case where the subsequent elements in the "temporary stop mode" are determined as being at the end of life. This enables avoiding temporary stopping of the process cartridge 106 two or more times. In a specific environment where a service engineer operation is performed, the CPU 201 can set the end-of-life warning to the same content as the life warning. As a result, a user can understand a state of the process cartridge 106 via the external system 100 without notification of a bothersome state change, and thus can make an appropriate response. A UI setting for changing the warning display contents can be provided. The CPU 201 changes the warning display content based on a setting content set through this UI setting. The CPU 201 can change the warning display content based on version information about specific firmware. Even in a case where the life limit is set and the "temporary stop mode" is set as the end-of-life as the operation setting at the end of life, the CPU 201 does not temporarily stop the processing at the end of life. This enables avoiding stopping at many times.

For example, in the specific environment where the service engineer operation is performed, the CPU 201 can change initial values of the operations at the end of life for the respective elements so that the processing continues without a warning. The CPU 201 can determine, based on version information about specific firmware, whether the processing is in the specific environment where the service engineer operation is to be performed.

In step S510, the CPU 201 determines whether an integrated life is a life limit for an element subject to the end-of-life processing in the elements determined as being at the end of life. In a case where the CPU 201 determines that the integrated life of the element subject to the end-of-life processing in the elements determined as being at the end of life is not the life limit (NO in step S510), the processing proceeds to step S511. In a case where the integrated life is the life limit (YES in step S510), the processing proceeds to step S513.

In step S511, the CPU 201 controls execution of print.

In step S512, the CPU 201 acquires a life of the toner remaining amount as an integrated life of the entire process cartridge. Then, the processing returns to step S507.

In step S513, the CPU 201 shifts the image forming apparatus 102 into a completely stopping state and inhibits the subsequent print operation.

In the processing according to the second exemplary embodiment, even in a case of overriding that the print operation is performed continuously after the end of life, the print operation can be securely prohibited based on the determination as to the end of life limit of a consumable product. Therefore, effects of failures of the image forming apparatus 102 and another consumable product 107 can be prevented.

While appropriate replacement timing of the consumable product tracked by a service engineer, a life warning display content is changed between the end of life and the life limit. As a result, an unnecessary call for the service engineer can be reduced.

The present exemplary embodiment can be applied not only to the process cartridge 106, but also to another consumable product 107.

The present exemplary embodiment describes a single-function printer that prints an image on a sheet as one example of the image forming apparatus. However, the present exemplary embodiment is not limited to this. For example, the present exemplary embodiment can also be applied to a multi-function peripheral (MFP) including a plurality of functions, such as a scan function and a print function.

The present exemplary embodiment can also be applied to various devices to which a storage section storing a consumable product is attachable. For example, the present exemplary embodiment can be applied to a three-dimensional (3D) printer to which a storage section that stores a consumable material, such as resin or metal, is attached, and forms a three-dimensional object using the consumable material. In this case, in place of the toner remaining amount, a remaining amount of the consumable material, such as resin or metal, can be calculated, and, in place of the life of the developing unit, a life of a 3D printer header that ejects the consumable material can be calculated.

Status management of consumable products according to the present exemplary embodiment can also be applied to a device such as an electronic cigarette. The electronic cigarette is used for aerosolizing a consumable material stored in the storage section, such as a cartridge or a liquid capsule, and inhaling the aerosolized material. In this case, in place of the toner remaining amount, a remaining amount of the consumable product can be calculated, and in place of the life of the developing unit, a life of an electrothermal part (for example, coil) for aerosolizing the consumable material can be calculated.

According to the above-described exemplary embodiments, a user can set the operation of the process cartridge at the end of life individually for the respective elements. In addition, at the time of the overriding, the operation can completely stop at appropriate timing. In a specific operation, a service operation can be improved by appropriately changing the warning display content.

The present disclosure provides a mechanism that controls a consumable product appropriately in accordance with a consumed level of the consumable product and the settings for the respective elements of the consumable product. In addition, the present disclosure enables controlling a consumable product appropriately based on user requests.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-152634, filed Aug. 7, 2017, which is hereby incorporated by reference herein in its entirety.

What is claimed is:

1. An image forming apparatus to which a unit including at least a cartridge configured to contain a recording material and a developing unit is attachable, the image forming apparatus comprising:
   a display device; and
   one or more processors configured to execute:
      displaying, on the display device, a first area that enables a user to select one of a plurality of options including at least a first option of not allowing the image forming apparatus to perform print processing using the recording material contained in the cartridge in which a remaining amount of the recording material contained is less than a first threshold and a second option of allowing the image forming apparatus to perform print processing using the recording material contained in the cartridge in which the remaining amount of the recording material contained is less than the first threshold without a user instruction and a third option of allowing the image forming apparatus to perform print processing using the recording material contained in the cartridge in which the remaining amount of the recording material contained is less than the first threshold based on a user instruction;
      displaying, on the display device, a second area that enables a user to select whether to allow the image forming apparatus to perform print processing using the developing unit, in a case that a remaining lifetime of the developing unit comes to a second threshold,
      wherein the cartridge and the developing unit are put together into the unit and detached from the image forming apparatus by detaching the unit from the image forming apparatus.

2. The image forming apparatus according to claim 1, further comprising a printer configured to print an image using the recording material contained in the cartridge, wherein, the printer performs processing corresponding to an option set via the first area in a case where the remaining amount of the recording material contained in the cartridge is less than the first threshold.

3. The image forming apparatus according to claim 2, wherein the printer performs print processing even if the remaining amount of the recording material contained in the cartridge is less than the first threshold without a warning while the image forming apparatus is in a specific mode.

4. The image forming apparatus according to claim 2, wherein the printer performs print processing even if the remaining amount of the recording material contained in the cartridge is less than the first threshold in a case where the second option is selected via the first area.

5. The image forming apparatus according to claim 2, wherein the printer does not perform print processing and the one or more processors display a cancellation screen to cancel not allowing print processing in a case where the remaining amount of the recording material contained in the cartridge becomes less than the first threshold in a case where the third option is selected via the first area.

6. The image forming apparatus according to claim 5, wherein the printer does not perform print processing without displaying the cancellation screen in a case where the remaining amount of the recording material contained in the cartridge is less than the first threshold even if the third option is selected via the first area.

7. The image forming apparatus according to claim 5, wherein the printer performs print processing even if the remaining amount of the recording material contained in the cartridge is less than the first threshold after the not allowing print processing is cancelled via the cancellation screen in a case where the third option is selected via the first area.

8. The image forming apparatus according to claim 2, wherein the printer does not perform print processing using the recording material contained in the cartridge if the remaining amount of the recording material contained in the cartridge less than the first threshold in a case where the first option is selected via the first area.

9. The image forming apparatus according to claim 1, wherein the recording material is toner.

10. The image forming apparatus according to claim 1, wherein the one or more processors execute:
    displaying, on the display device, a setting screen to set a third threshold based on a user's instruction, and
    displaying, on the display device, a screen to prompt a user to prepare a new unit in a case where the remaining amount of the recording material contained in the cartridge is less than the third threshold set via the setting screen.

11. The image forming apparatus according to claim 1, wherein the developing unit performs, on a photosensitive drum, image forming using the recording material.

12. An image forming apparatus to which a unit including at least a cartridge configured to contain a recording material and a developing unit is attachable, the image forming apparatus comprising:
    one or more processors configured to execute:
    performing first setting indicating whether to require a replacement of the cartridge for continuing to print in a case that a remaining lifetime of the developing unit comes to a first threshold;
    performing second setting indicating whether to require a replacement of the developing unit for continuing to print in a case that a remaining amount of the recording material contained in the cartridge comes to a second threshold;
    allowing the cartridge in the unit including the developing unit, the remaining lifetime of which has come to the first threshold and the developing unit to be used for printing when the first setting indicates not to require the replacement of the cartridge, and inhibiting the cartridge in the unit including the developing unit, the remaining lifetime of which has come to the first threshold and the developing unit from being used when the first setting indicates to require the replacement of the cartridge;
    allowing the developing unit in the unit including the cartridge, the remaining amount of the recording material contained in which has come to the second threshold and the cartridge to be used for printing images when the second setting indicates not to require the replacement of the developing unit, and inhibiting the developing unit in the unit including the cartridge, the remaining amount of the recording material contained in which has come to the second threshold and the cartridge from being used when the second setting indicates to require the replacement of the developing unit.

13. The image forming apparatus according to claim 12, wherein the cartridge and the developing unit are put together into the unit and detached from the image forming apparatus by detaching the unit from the image forming apparatus.

14. The image forming apparatus according to claim 12, wherein the remaining lifetime of the developing unit is set at least based on number of rotations of the developing unit.

15. The image forming apparatus according to claim 12, wherein the one or more processors further execute:
performing a third setting indicating whether to display a screen for accepting a user instruction for continuing printing without the replacement of the cartridge in a case that the remaining lifetime of the developing unit comes to the first threshold.

16. The image forming apparatus according to claim 12, wherein the remaining lifetime of the developing unit is set at least based on number of rotations of the developing unit.

17. An image forming apparatus to which a unit including at least a cartridge configured to contain a recording material and a developing unit is attachable, the image forming apparatus comprising:
one or more processors configured to execute:
performing first setting indicating whether to require a replacement of the unit for continuing to print in a case that a remaining lifetime of the developing unit comes to a first threshold;
performing second setting indicating whether to require a replacement of the unit for continuing to print in a case that a remaining amount of the recording material contained in the cartridge comes to a second threshold;
allowing the unit including the developing unit, the remaining lifetime of which has come to the first threshold to be used for printing when the first setting indicates not to require the replacement of the unit including the cartridge, and inhibiting the unit including the developing unit, the remaining lifetime of which has come to the first threshold from being used when the first setting indicates to require the replacement of the unit including the cartridge;
allowing the unit including the cartridge, the remaining amount of the recording material contained in which has come the second threshold to be used for printing when the second setting indicates not to require the replacement of the unit including the developing unit, and inhibiting the unit including the cartridge, the remaining amount of the recording material contained in which has come to the second threshold from being used when the second setting indicates to require the replacement of the unit including the developing unit.

18. The image forming apparatus according to claim 17, wherein the cartridge and the developing unit are put together into the unit and detached from the image forming apparatus by detaching the unit from the image forming apparatus.

19. The image forming apparatus according to claim 17, wherein the one or more processors further execute:
performing a third setting indicating whether to display a screen for accepting a user instruction for continuing printing without the replacement of the unit in a case that the remaining lifetime of the developing unit comes to the first threshold.

* * * * *